(12) United States Patent
Lee et al.

(10) Patent No.: US 6,994,808 B2
(45) Date of Patent: Feb. 7, 2006

(54) PLANAR LENS AND METHOD FOR FABRICATING THE SAME

(75) Inventors: Myung-bok Lee, Kyungki-do (KR); Jin-seung Sohn, Seoul (KR); Eun-hyoung Cho, Kyungki-do (KR); Young-pil Park, Seoul (KR)

(73) Assignee: Samsung Electronics Co., Ltd., Suwon (KR)

( * ) Notice: Subject to any disclaimer, the term of this patent is extended or adjusted under 35 U.S.C. 154(b) by 41 days.

(21) Appl. No.: 10/419,080

(22) Filed: Apr. 21, 2003

(65) Prior Publication Data

US 2004/0095656 A1 May 20, 2004

(30) Foreign Application Priority Data

Nov. 14, 2002 (KR) .................... 10-2002-0070662

(51) Int. Cl.
*B29D 11/00* (2006.01)
(52) U.S. Cl. .................. 264/1.21; 65/17.2; 216/26; 264/1.32; 264/1.38; 264/496
(58) Field of Classification Search ............... 264/1.21, 264/2.5, 1.1, 1.32, 496, 2.1, 1.38; 65/17.2; 216/24, 26
See application file for complete search history.

(56) References Cited

U.S. PATENT DOCUMENTS 5,349,471 A * 9/1994 Morris et al. ............... 359/565
5,538,674 A * 7/1996 Nisper et al. ............... 264/1.31

FOREIGN PATENT DOCUMENTS

| JP | 1-130920 | * | 5/1989 |
| JP | 9-505245 | | 5/1997 |
| JP | 2002-006115 | | 1/2002 |
| KR | 2003019654 | * | 3/2003 |

OTHER PUBLICATIONS

Notice to Submit Response issued by the Korean Patent Office on Aug. 27, 2004 in corresponding application 10-2002-0070662.
Kouchiyama, A., et al., *Optical Recording Using High Numerical-Aperture Microlens by Plasma Etching*, Jpn. J. Appl. Phys. vol. 40 (2000), pp. 1792-1793.
Yamada, M., et al., *A Novel Microminiaturized Aspherical Lens With a High Numerical Aperture*, Technical Digest, ISOM/ODS 2002, pp. 398-400.

* cited by examiner

Primary Examiner—Mathieu D. Vargot
(74) Attorney, Agent, or Firm—Buchanan Ingersoll PC

(57) ABSTRACT

A planar lens capable of compensating for chromatic aberration and which is easy to manufacture and enables easy assembling of optical pickups and a method for fabricating the planar lens are provided. The planar lens includes a transparent substrate with a lens cavity in a surface of the transparent substrate, and a lens element formed in the lens cavity with a first refracting surface in contact with the bottom of the lens cavity and a second diffracting surface having a diffraction grating opposite to the first refracting surface.

19 Claims, 8 Drawing Sheets

PLANAR LENS AND METHOD FOR FABRICATING THE SAME

BACKGROUND OF THE INVENTION

This application claims priority from Korean Patent Application No. 2002-70662, filed on Nov. 14, 2002, in the Korean Intellectual Property Office, the disclosure of which is incorporated herein in its entirety by reference.

1. Field of the Invention

The present invention relates to a planar lens and a method for fabricating the same, and more particularly, to an easy-to-fabricate planar objective lens capable of compensation of chromatic aberration, as an essential part of an optical pickup that is used in an optical disc drive (ODD) to write information in and/or reproduce information from an optical disc, such as a compact disc (CD) or a digital versatile disc (DVD), and an easy method for fabricating the planar microlens.

2. Description of the Related Art

Objective lenses are used to write information in an optical disc by focusing a laser beam emitted from a semiconductor laser used as a light source on a recording surface of the optical disc and to read information from an optical disc by condensing light reflected from its recording surface toward a photodetector. Conventionally, objective lenses for use in writing and reading information with respect to optical information storage media have been fabricated by mechanically cutting and polishing solid glass or plastics to a desired shape. Another conventional methods for fabricating such objective lenses use compression molding or injection molding in which objective lenses are fabricated from molten or semi-molten glass or plastics using molds formed by mechanical processing.

To fabricate an objective lens by compression molding, as shown in FIG. 1, upper and lower molds 2a and 2b, which are located above and below a target object to be manufactured, i.e., a lens 1, respectively, a ring 3 interposed between the upper and lower molds 2a and 2b, and a sleeve 4 as a support for the upper and lower molds 2a and 2b are necessary. These upper and lower molds 2a and 2b are commonly manufactured by a high precision lathe with a diamond wheel. However, this mold processing method is limited as to processing a curved mold surface corresponding to a spherical or aspheric lens surface. In particular, to form a spherical or aspheric lens surface, a mold needs to be machined for a concave surface that matches the desired spherical or aspheric lens surface. However, it is difficult to machine a concave mold for lenses under about 1 millimeter in diameter with the mechanical mold machining method, because cutting tools and the curvature of diamond wheels therefore are limited.

Recent trends toward portable, miniature, and high-density optical discs necessitate smaller optical pickups compatible with these miniature optical discs. Smaller optical pickups should be assembled with smaller constituent optical elements, such as a laser diode, a collimator, a mirror, an objective lens, a photodetector, and the like. However, it is more difficult to manufacture and assemble smaller optical elements, especially with microlenses having a diameter of 1 mm or less because of difficulties in mold machining therefor, as described above. Due to the limitation in mold machining, the smallest known lenses manufactured thus far, for example, by injection molding with a numerical aperture (NA) of 0.85, have a diameter of about 4 mm. Even though such microlenses of 1 mm or less in diameter can be manufactured, it is difficult to handle such a small microlens and to assemble an optical pickup with the microlens.

General objective lenses have two opposing surfaces that are spherical or aspheric and which protrude closer to an optical disc, compared to other adjacent optical elements, so they are likely to be abraded or damaged when collided with the optical disc.

To eliminate these problems, there have been suggested techniques for fabricating objective lenses in an array in a planar substrate using, for example, conventional semiconductor manufacturing processes. These methods are advantageous for mass production and enable easy assembling of optical pickups at low costs.

FIGS. 2A through 2D illustrate a process of fabricating a microlens array suggested by Akira Kouchiyama et al. (Japanese J. Appl. Phys., Part 1, Vol. 40, No. 3B, p. 1792, 2001).

Briefly, in the method suggested by Akira Kouchiyama, a glass substrate 5 is coated with a photoresist 6, as shown in FIG. 2A. After patterning, as illustrated in FIG. 2B, the resulting photoresist pattern 6' is reflowed by heating to a predetermined temperature, for example, about 150° C. Through this reflow process, a hemispheric photoresist pattern 6" is formed, as shown in FIG. 2C. Next, reactive ions are supplied into a plasma etching chamber to etch the substrate 5 through the hemispheric photoresist pattern 6" so that a microlens array is formed in the glass substrate 5, as shown in FIG. 2D. As the photoresist pattern 6 is reflowed by heating, the photoresist pattern 6' becomes hemispheric by surface tension generated during the reflow. As the plasma dry etching is performed on the glass substrate 5 under appropriate conditions with the hemispheric photoresist 6" serving as a mask, the hemispheric shape of the mask is transferred into the glass substrate 5. The resulting microlens array has a spherical refractive surface.

In this microlens array manufacturing method by plasma etching, it is difficult to uniformly deposit the photoresist to a sufficient thickness for an objective lens of appropriate thickness so that the sag height of the resulting microlens is limited. In addition, since the hemispheric photoresist pattern formed by reflowing is directly transferred into a glass substrate, the method cannot be applied for general aspheric lenses excluding spherical lenses. Dry etching applied to manufacture the microlens array takes a comparatively longer duration.

According to a microlens manufacturing method suggested by Masahiro Yamada et al., Technical Digest of ISOM/ODS 2002, p. 398, a substrate with a cavity for a lens used for optical control is manufactured by injection molding, and the cavity is filled with a high refractive index material and subjected to polishing to form a planar lens.

Masahiro's method requires a mold of a desired shape to form the cavity in the substrate. Unlike general molding processes where a cavity is formed in a substrate to correspond to a convex surface of a desired lens, a mold shaped like a plug or insert with a convex surface that matches a desired cavity of a substrate is formed by mechanical machining. Over the substrate with the cavity formed through injection molding using the plug-like mold, a high refractive index material is deposited to a predetermined thickness by sputtering and polished such that the high refractive index material remains only in the cavity of the substrate. The cavity filled with the high refractive index material substantially acts as a lens.

This method is suitable to manufacture single microlens but not for an array of multiple lenses. Also, the thin film deposition technique, i.e., sputtering, used in the method takes a long duration for a lens layer having an appropriate thickness. Furthermore, it is also time consuming to polish the deposited high refractive index material lens layer.

SUMMARY OF THE INVENTION

The present invention provides a planar objective lens that is easy to manufacture, enables easy assembling of optical pickups, and has good optical performance, and a method for fabricating the planar objective lens.

According to an aspect of the present invention, there is provided a planar lens comprising: a transparent substrate with a lens cavity in a surface of the transparent substrate; and a lens element formed in the lens cavity with a first refracting surface in contact with the bottom of the lens cavity and a second diffracting surface having a diffraction grating opposite to the first refracting surface.

In a planar lens according to the present invention, the lens element may be formed of a higher refractive index material than a material for the transparent substrate.

According to another aspect of the present invention, there is provided a method for fabricating a planar lens, the method comprising: (a) forming a lens cavity in a transparent substrate; (b) filling the lens cavity with a lens forming material; and (c) forming a diffraction grating in the surface of the lens cavity filled with the lens forming material.

In a method for fabricating a planar lens according to the present invention, step (b) may be performed by a sol-gel method including spin coating and baking of the lens forming material. In step (a), the lens cavity may be formed with a spherical or aspheric bottom surface.

Alternatively, the present invention provides a method for fabricating a planar lens comprising a lens element formed in a lens cavity of a transparent substrate, the lens element having a first refracting surface in contact with the bottom of the lens groove and a second diffracting surface having a diffraction grating opposite to the first refracting surface, the method comprising: (a) forming the lens cavity in the transparent substrate; (b) bringing a mold with a pattern region that matches the diffraction grating of the lens element to the transparent substrate such that the pattern region of the mold is aligned above with the lens cavity; (c) injecting a liquid state lens forming material containing a high refractive index material precursor into the lens cavity; (d) curing the liquid state lens forming material in the lens cavity; and (e) separating the mold from the transparent substrate.

In another embodiment of the above method, the liquid state lens forming material may be solid-nucleated by UV irradiation and is fully cured by heating. Preferably, the liquid state lens forming material is an alkoxide solution comprising a precursor of $(Si,Ti)O_2$.

In step (a), the lens cavity may be formed with a spherical or aspheric bottom surface.

In still another embodiment of the above method according to the present invention, step (a) of forming the lens cavity in the transparent substrate may comprise: forming on a substrate a mask with a window through which a lens cavity region of the substrate is exposed; etching the lens cavity region of the substrate exposed through the window by isotropic dry or wet etching to form the lens cavity below the window; and removing the mask from the substrate.

In yet still another embodiment of the above method according to the present invention, step (a) of forming the lens cavity in the transparent substrate comprises: depositing photoresist over the top surface of the transparent substrate; forming in the deposited photoresist a groove which is the same in shape as the lens cavity to be formed; and etching the deposited photoresist to a depth in the substrate to transfer the shape of the groove into the transparent substrate, thereby resulting in the lens cavity in the transparent substrate. In this case, forming the groove in the deposited photoresist may be performed by exposure to light through a gray scale mask or by direct exposure to laser beams or electron beams.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Exemplary embodiments of an objective lens a method for fabricating the same according to the present invention will be described with reference to the appended drawings.

Figure 1:
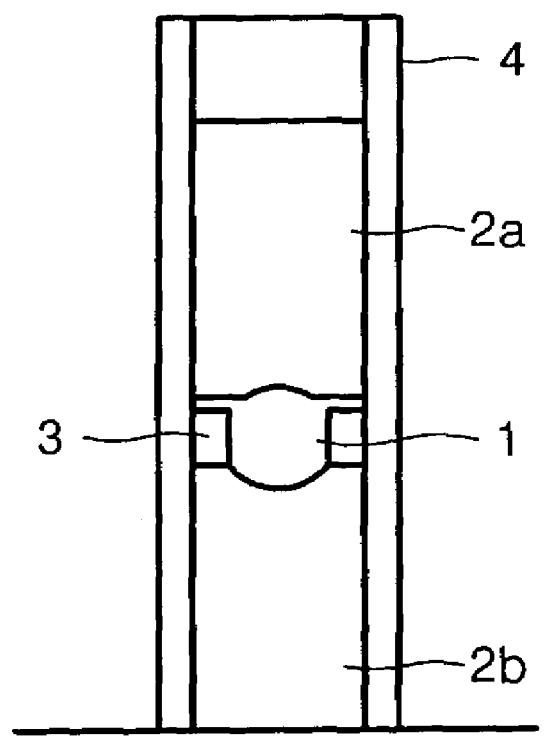
FIG. 1 illustrates an example of a conventional method for fabricating an objective lens.
Figure 2A:
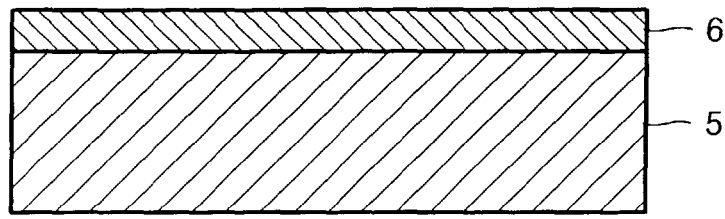
FIGS. 2A through 2D are sectional views illustrating a conventional method for fabricating a microlens array.
Figure 2B:
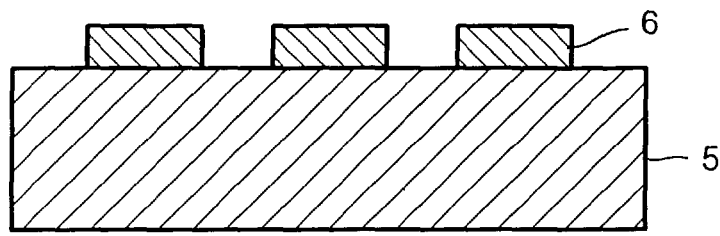
Figure 2C:
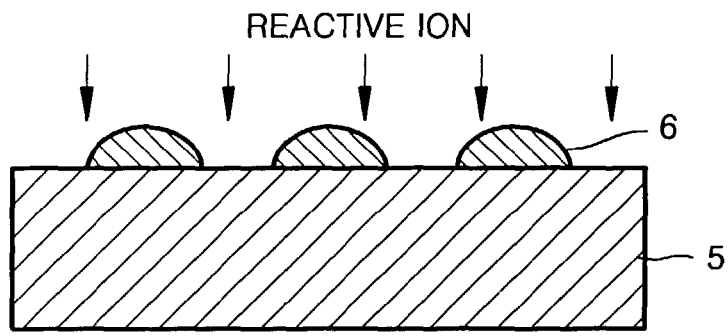
Figure 2D:
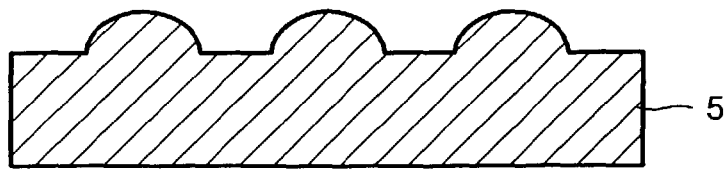
Figure 3:
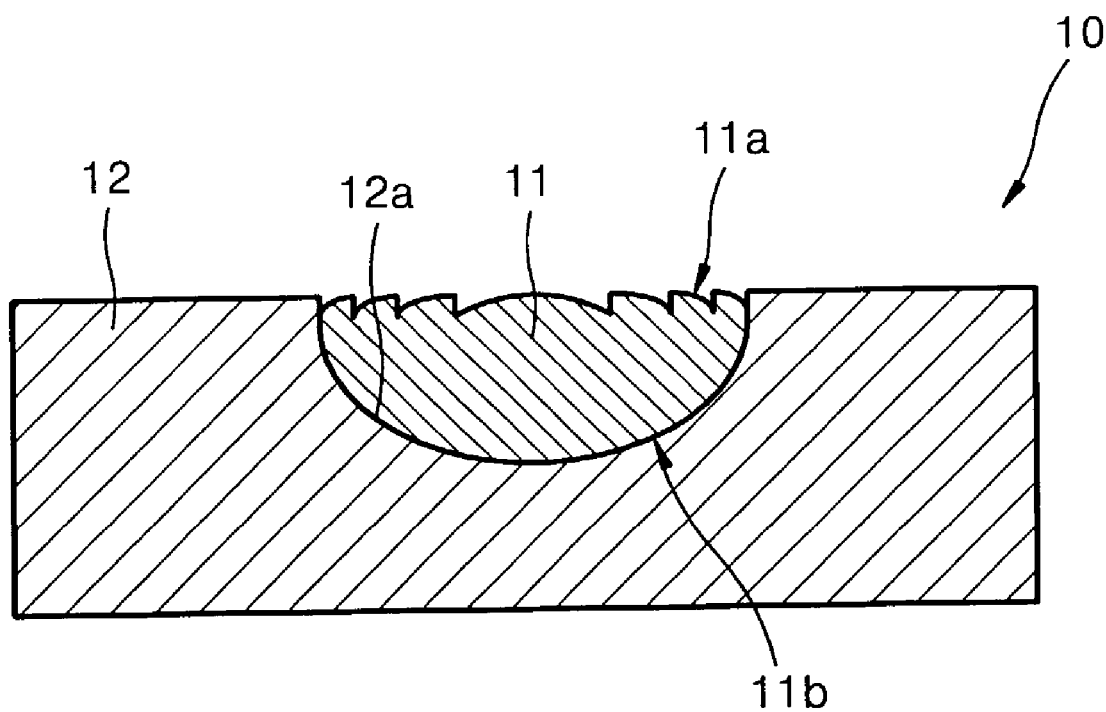
FIG. 3 is a sectional view of a planar objective lens according to an embodiment of the present invention.

Referring to FIG. 3, an objective lens 10 according to an embodiment of the present invention has a configuration including a lens element 11 in a lens cavity 12a formed in the middle of the top surface of a substrate 12 with a concave aspheric or spherical surface. The lens element 11 has a first surface corresponding to the bottom of the lens cavity 12a and a second surface opposite to the first surface. The first surface of the lens element 11 is a refracting surface 11b having a spherical or aspheric curvature that matches the bottom contour of the lens cavity 12a, and the second surface is a diffracting surface with a diffraction grating.

The objective lens 10 of FIG. 3 is a planar lens formed by filling the lens cavity 12a of the substrate 12 with the lens element 11, unlike general convex objective lenses whose refracting surfaces are convexed outward. In this objective lens 10 having the above configuration, for example, when a laser beam is incident on the bottom of the substrate 12 from a light source (not shown), the laser beam is primarily focused by being refracted at the reflecting surface 11b of the lens element 11 and secondarily focused at the diffracting surface 11a into a smallest light spot possible close to the diffraction limit. This diffracting surface 11a of the lens element 11 is designed to make it enable to compensate for lens aberration, and particularly, chromatic aberration, as well as to focus light, with the same shape as general Fresnel lenses.

Hereinafter, a method for fabricating a planar objective lens, having a configuration as described above, according to the present invention will be described in detail. Although the formation of a single lens is described in the following, the method described below can be applied to fabricate an array of multiple lenses in a single substrate.

Figure 4A:
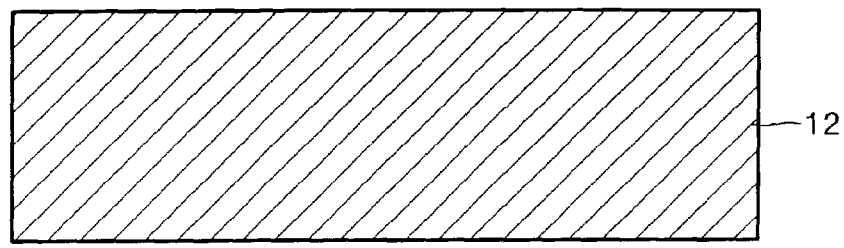
FIGS. 4A through 4D are sectional views illustrating a method for fabricating a planar objective lens according to an embodiment of the present invention.
Figure 4B:
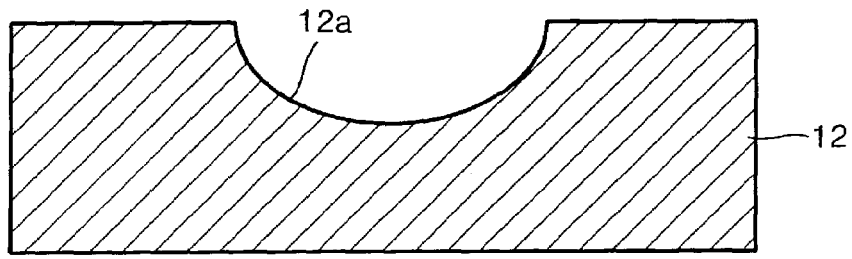

FIGS. 4A through 4D illustrate a method for fabricating a planar objective lens according to an embodiment of the present invention. Referring to FIG. 4A, initially, a transparent glass substrate 12 is prepared. Next, a lens cavity 12a is formed in the glass substrate 12, as shown in FIG. 4B. The lens cavity 12a is formed by photolithography followed by wet etching or dry etching with a mask.

Figure 4C:
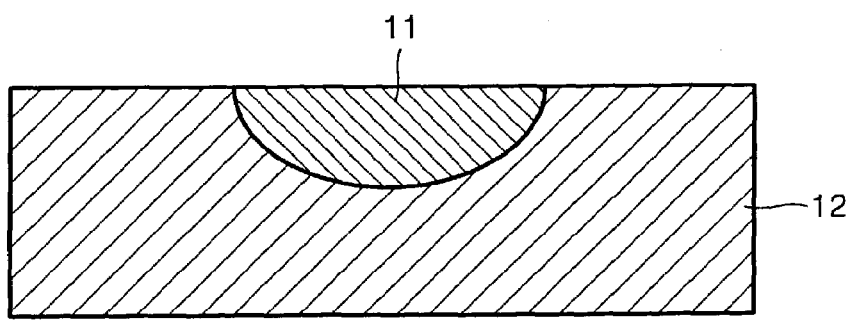

As shown in FIG. 4C, the lens cavity 12a is filled with a high refractive index material to form a lens element 11. In particular, over the surface of the substrate 12 with the lens cavity 12a, the high refractive index material is deposited by a sol-gel method, in which spin coating and baking of the high refractive material are repeatedly performed to form a coated layer of a desired thickness. Next, the coated layer of high refractive material is polished such that the high refractive material remains only in the lens cavity 12a, forming the lens element 11.

Figure 4D:
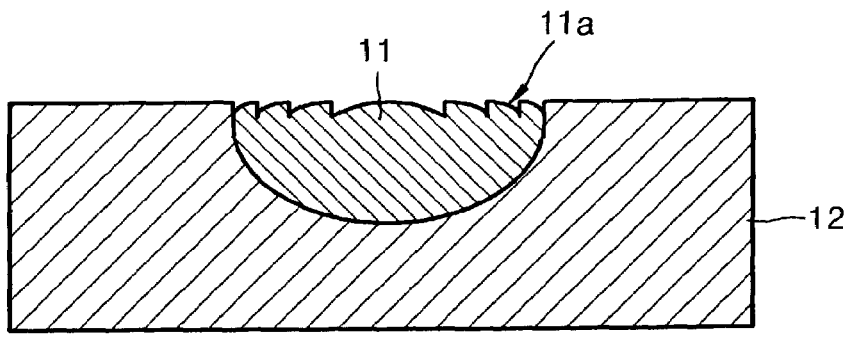

As shown in FIG. 4D, a diffraction grating is formed on the surface of the lens element 11 in the lens cavity to provide a desired objective lens according to the present invention.

Hereinafter, the method for fabricating an objective lens described with reference to FIG. 4 will be described in more detail. FIGS. 5 and 6 illustrate embodiments of a method for forming the lens cavity 12a in the substrate 12 in the fabrication of the objective lens illustrated in FIG. 4.

Embodiment 1 of Lens Cavity Formation

Figure 5A:
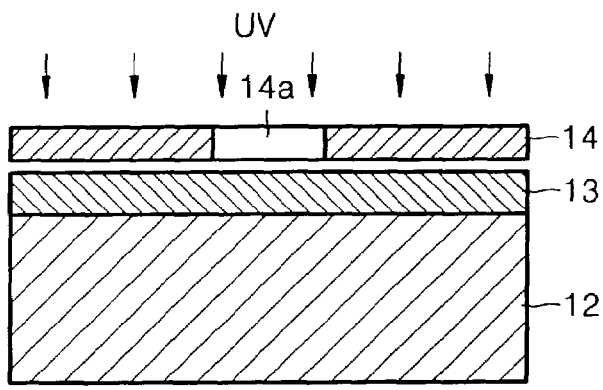
FIGS. 5A through 5D are sectional views illustrating an embodiment of a method for forming a lens cavity in a substrate in the manufacture of a planar objective lens according to the present invention.

Referring to FIG. 5A, the entire surface of a prepared substrate 12 is coated with photoresist 13 and subjected to light exposure through a mask 14 with a window 14a as a light transmission path. In this embodiment, positive photoresist is used so that a region to be etched is exposed to form the lens cavity 12a therebelow.

Figure 5B:
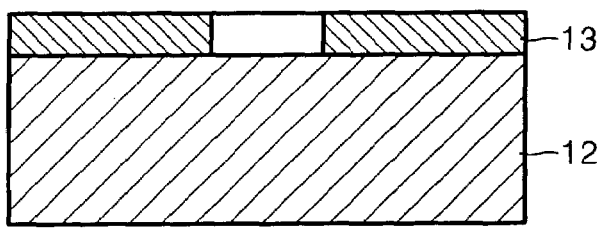

Next, the exposed region of the photoresist 13 is removed through a development process, as shown in FIG. 5B, to expose a cavity region of the substrate 12.

Figure 5C:
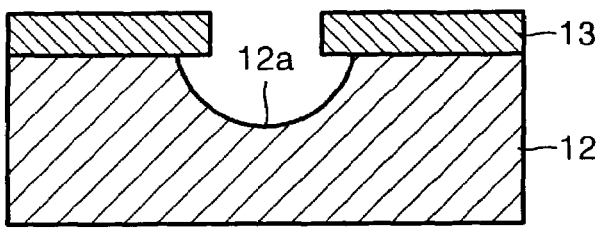

The exposed cavity region of the substrate 12, which is uncovered with the photoresist 13, is subjected to isotropic dry or wet etching so that the lens cavity 12a with a spherical bottom surface is formed, as shown in FIG. 5C.

Figure 5D:
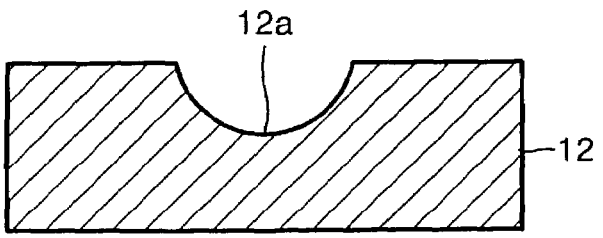

After the remaining photoresist 13 is stripped away, as shown in FIG. 5D, and the process illustrated in FIG. 4C is performed.

Embodiment 2 of Lens Cavity Formation

Figure 6A:
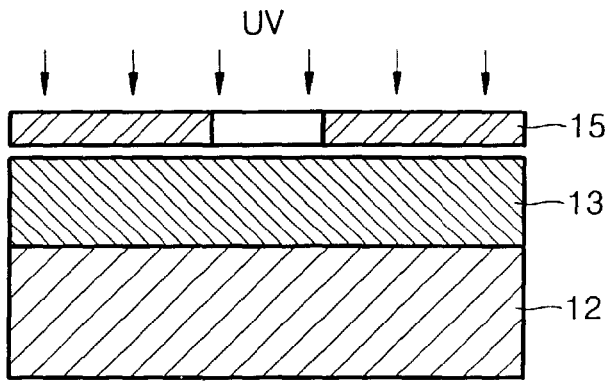
FIGS. 6A through 6D are sectional views illustrating another embodiment of the method for forming a lens cavity in a substrate in the manufacture of a planar objective lens according to the present invention.

Referring to FIG. 6A, the entire surface of a prepared substrate 12 is coated with photoresist 13 and subject to light exposure through a gray scale mask 15 with a window 15 whose light transmittance locally varies. In this embodiment, positive photoresist is used so that a region to be etched is exposed to form the lens cavity 12a therebelow.

Since the window 15a of the gray scale mask 14 used in this embodiment has locally varying light transmittance, the amount of light radiated on the photoresist 13 during the exposure process through the window 15a is not uniform throughout the exposed region. The light transmittance of the window of the gray scale mask 14 needs to be appropriately controlled according to the curvature of a desired spherical or aspheric lens.

Figure 6B:
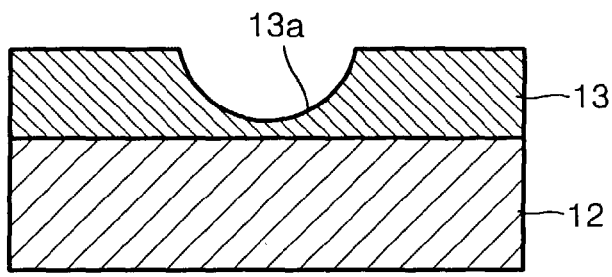

Next, a spherical or aspheric groove 13a is formed in the photoresist 13 through a development process, as shown in FIG. 6B.

Figure 6C:
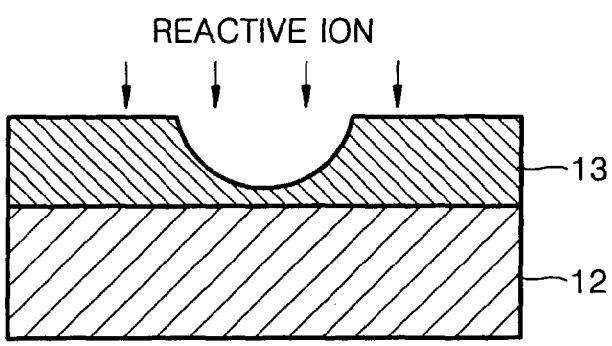
Figure 6D:
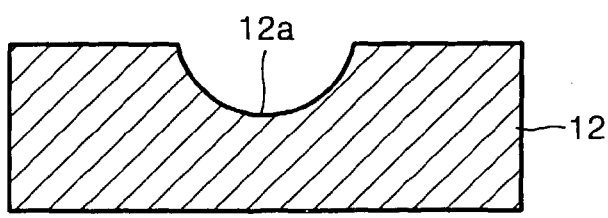

Next, as shown in FIG. 6C, dry etching, for example, reactive ion etching, is performed on the photoresist 13 and into the substrate 12 to transfer the spherical or aspheric groove 13a in the photoresist 13 into the substrate 12. As a result, a lens cavity 12a is formed in the substrate 12, as shown in FIG. 6D. After the formation of the lens cavity 12a is completed, the process illustrated in FIG. 4C above is performed.

In the process of FIG. 4C, as the high refractive index material to fill the lens cavity 12a, a material having a refractive index of 2.0 or greater and a high transmittance to blue light, for example, having a wavelength of 405 nm, such as $SiO_2$, $TiO_2$, $ZrO_2$, $HfO_2$, $SrTiO_3$, $BaTiO_3$, $PbTiO_3$, PZT, PLZT, and the like, and combination of two or more substances from these materials and which is compatible with a sol-gel technique may be used.

In this sol-gel method, a relatively uniform and thick layer can be formed within a short time, compared to general physical deposition methods, such as sputtering. Since the top surface of the lens element formed as a result of filling the lens cavity 12a with the high refractive index material is uneven, the lumpy top surface of the lens element is polished (FIG. 4C). Next, a diffraction grating is formed on the surface of the lens element formed of the high refractive index material (FIG. 4D). In forming a refracting surface of the lens element, methods applied to form general diffraction optical elements (DOE), including photolithography using binary optics, gray scale photolithography, and direct lithography using electron beams or laser beams, may be used.

Figure 7A:
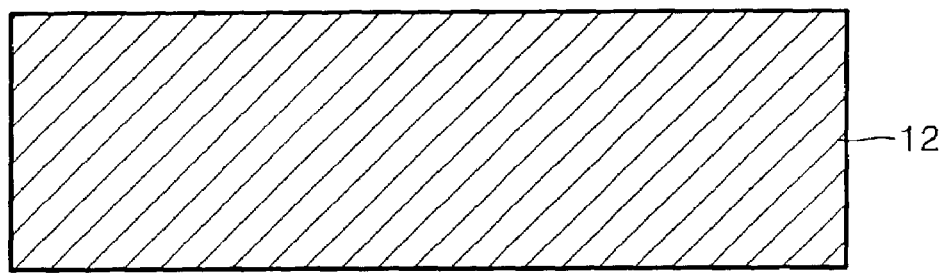
FIGS. 7A through 7E are sectional views illustrating a method for fabricating a planar objective lens according to another embodiment of the present invention.
Figure 7B:
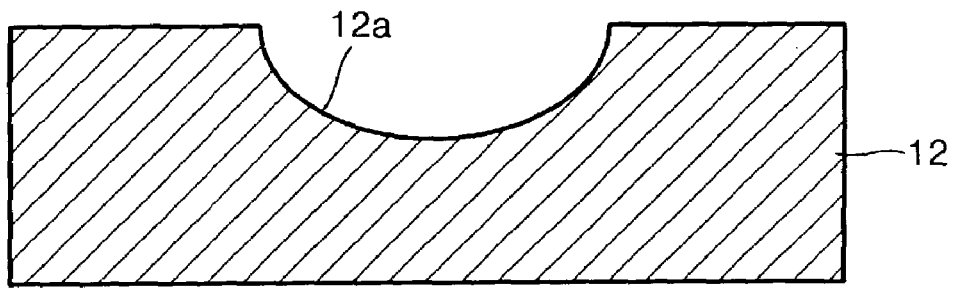

FIGS. 7A through 7E illustrate a method for fabricating a planar objective lens according to another embodiment of the present invention. Referring to FIG. 7A, initially, a substrate is prepared. Next, a lens cavity 12a is formed in the substrate 12, as shown in FIG. 7B, using any one of the methods described in Embodiments 1 and 2 above.

Figure 7C:
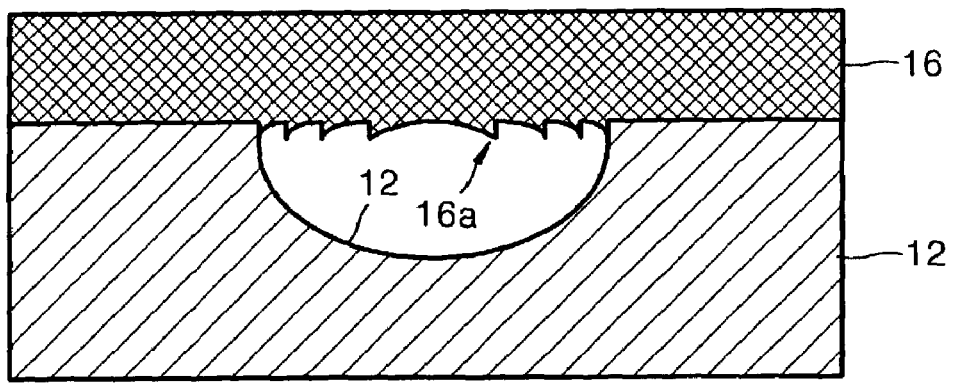

As shown in FIG. 7C, a cover mold 16 having a pattern region 16a that matches the diffracting surface 11a (see FIG. 3A) of a desired lens element (diffractive lens) is prepared and aligned on and assembled with the substrate 12. To form this cover mold 16, a master substrate is manufactured with the same pattern as a diffraction grating of the diffraction surface 11a of a desired diffraction lens or a desired diffraction lens array, and the cover mold 16 having the pattern region 16a that has an inverse pattern with respect to the diffraction grating of the desired diffraction lens and matches it is manufactured from the master substrate, for example, by nickel plating.

Figure 7D:
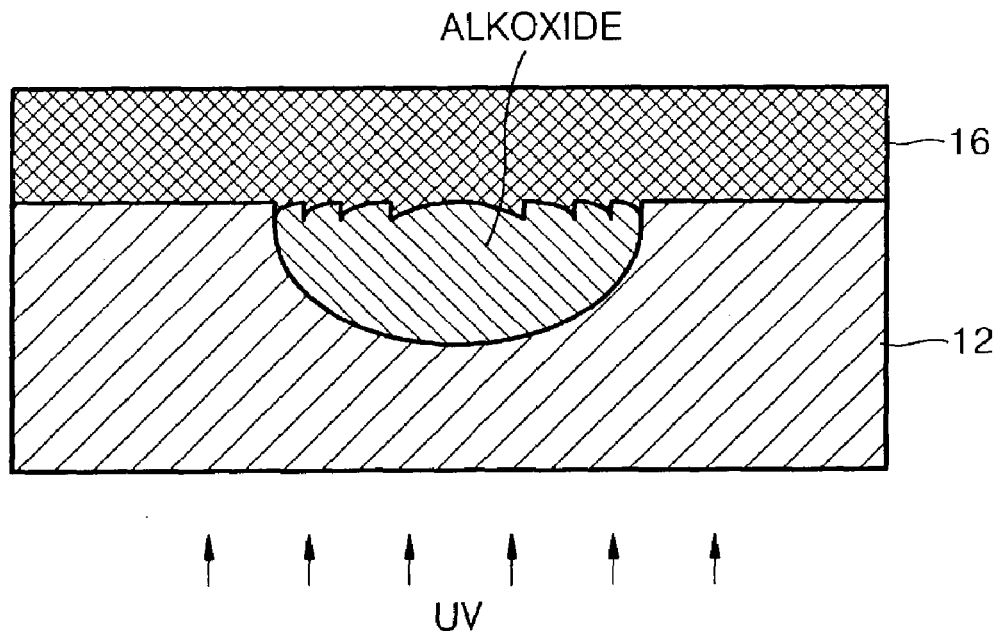

Next, as shown in FIG. 7D, a lens forming material, for example, an alkoxide solution containing a precursor of $(Si,Ti)O_2$ is injected into the lens cavity 12a covered with the cover mold 16. Any solution containing any precursor of high refractive index material, excluding $(Si,Ti)O_2$, may be used as the lens forming material. After injecting the lens forming material, the bottom surface of the substrate 12 is irradiated with ultraviolet (UV) rays for nucleation of the lens forming material into a semi-solid state. Next, the substrate 12 is heated to a predetermined temperature to fully cure the lens forming material.

Figure 7E:
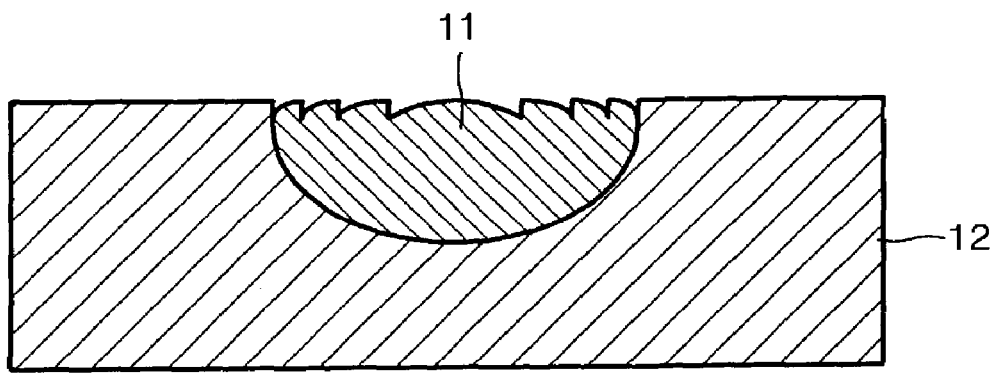

After the lens forming material is fully cured into the lens element 11, the cover mold 16 is removed to provide a desired objective lens or objective lens array, as shown in FIG. 7E.

According to the method described in this embodiment, neither repeatedly spin coating the substrate with a lens material solution and baking the same, as in the sol-gel method described in the above embodiment with reference to FIGS. 4A through 4D, nor accompanying surface polishing are necessary. When a previously manufactured cover mold is available, a desired lens element can be manufactured within a short time by merely applying the above UV curing technique. Therefore, the method described in this embodiment is highly advantageous for mass production. In addition, the use of a cover mold as described above makes it to form a desired diffracting surface easier, compared to photolithography using binary optics, gray scale photolithography, and direct lithography using electron beams or laser beams.

A planar objective lens according to the present invention manufactured by the method as described above provides structural advantages as follows.

First, unlike general objective lenses manufactured by compression or injection molding, since the objective lens according to the present invention is formed planar with a lens element buried in a planar substrate, it is easy to handle, and optical pickups can be easily assembled with this objective lens. In addition, the thickness of the objective lens can be minimized for miniature optical pickups. When a plurality of objective lenses are simultaneously manufactured on a wafer level, integrated optical pickups can be easily assembled with high efficiency, by easily aligning with another wafer on which other optical elements are mounted and binding thereto.

Second, the lens element of an objective lens according to the present invention has a refracting surface at one surface and a diffracting surface at the opposite surface, providing a great light focusing effect by the two lens surfaces. Therefore, an objective lens having a large numerical aperture (NA) can be manufactured. In addition, through proper combination of the refracting and diffracting surfaces, chromatic aberration-free achromatic lenses can be fabricated.

A method for fabricating a planar objective lens according to the present invention is advantageous in the following aspects.

First, according to the present invention, in forming a lens cavity in a substrate, rather than molding techniques using an embossed mold, wet or dry etching techniques, which are commonly used in the manufacture of semiconductor devices and enable microprocessing, are applied. Therefore, miniature microlenses in an array can be manufactured on a wafer level.

Second, since a high refractive index material for lenses are applied by sol-gel methods or UV curing methods, instead of physical thin film deposition techniques, such as sputtering, the overall processing time can be reduced. In addition, UV curing methods need no subsequent surface polishing following deposition of high refractive index materials, so that the overall manufacturing time is markedly reduced with high productivity.

A planar objective lens according to the present invention can be used in a portable miniature drive for optical discs having a small diameter of 30 mm or less and using semiconductor laser light of a blue wavelength of 400–410 nm as a light source for recording and reproduction. This planar objective lens according to the present invention has a numerical aperture (NA) of 0.85 and can be used to record and reproduce audio and video data in a portable minidisk (MD) player, a digital camcoder, a digital camera, a personal digital assistant (PDA), a MP3 player, etc. The planar objective lens according to the present invention can be applied to any kinds of optical pickups of different sizes for various disc drives as well as for optical discs having a 1-GB data capacity and a 30-mm or less diameter that need a blue wavelength light source.

While the present invention has been particularly shown and described with reference to exemplary embodiments thereof, it will be understood by those of ordinary skill in the art that the present invention is not limited to a particular configuration and arrangement described above and various changes in form and details may be made therein without departing from the spirit and scope of the present invention as defined by the following claims.

What is claimed is:

1. A method for fabricating a planar lens, the method comprising:
   (a) forming a lens cavity in a transparent substrate;
   (b) filling the lens cavity with a lens forming material; and
   (c) forming a diffraction grating in the surface of said material filling the lens cavity while said material is in the cavity using a mold with a pattern region that matches the diffraction grating, wherein a combination of said transparent substrate and said material having said surface with a diffraction grating comprise said planar lens.

2. The method of claim 1, wherein step (b) is performed by a sol-gel method including spin coating and baking of the lens forming material.

3. The method of claim 1, wherein, in step (a), the lens cavity is formed with a spherical bottom surface.

4. The method of claim 1, wherein step (a) of forming the lens cavity in the transparent substrate comprises:
   forming on said transparent substrate a mask with a window through which a lens cavity region of the transparent substrate is exposed;
   etching the lens cavity region of the transparent substrate exposed through the window to form the lens cavity below the window; and
   removing the mask from the transparent substrate.

5. The method of claim 1, wherein step (a) of forming the lens cavity in the transparent substrate comprises:
   depositing photoresist over the top surface of the transparent substrate;
   forming in the deposited photoresist a groove which is the same in shape as the lens cavity to be formed; and
   etching the deposited photoresist to a depth in the transparent substrate to transfer the shape of the groove into the transparent substrate, thereby resulting in the lens cavity in the transparent substrate.

6. The method of claim 5, wherein forming the groove in the deposited photoresist is performed by exposure to light through a gray scale mask.

7. A method for fabricating a planar lens comprising a lens element formed in a lens cavity of a transparent substrate, the lens element having a first refracting surface in contact with the bottom of the lens groove and a second diffracting surface having a diffraction grating, said second diffracting surface being opposite to the first refracting surface, the method comprising:
   (a) forming the lens cavity in the transparent substrate;
   (b) bringing a mold with a pattern region that matches the diffraction grating of the lens element to the transparent substrate such that the pattern region of the mold is aligned above with the lens cavity;
   (c) injecting a lens forming material in liquid state and containing a high refractive index material precursor into the lens cavity;
   curing the liquid state lens forming material in the lens cavity; and separating the mold from the transparent substrate, wherein said cured lens forming material and said transparent substrate comprise said planar lens.

8. The method of claim 7, wherein curing the liquid state lens forming material includes solid nucleation by UV irradiation and heating.

9. The method of claim 7, wherein the liquid state lens forming material is an alkoxide solution comprising a precursor of $(Si,Ti)O_2$.

10. The method of claim 7, wherein, in step (a), the lens cavity is formed with a spherical bottom surface.

11. The method of claim 7, wherein step (a) of forming the lens cavity in the transparent substrate comprises:
   forming on said transparent substrate a mask with a window through which a lens cavity region of the transparent substrate is exposed;
   etching the lens cavity region of the transparent substrate exposed through the window by isotropic dry or wet etching to form the lens cavity below the window; and
   removing the mask from the transparent substrate.

12. The method of claim 7, wherein step (a) of forming the lens cavity in the transparent substrate comprises:
   depositing photoresist over the top surface of the transparent substrate;
   forming in the deposited photoresist a groove which is the same in shape as the lens cavity to be formed; and
   etching the deposited photoresist to a depth in the transparent substrate to transfer the shape of the groove into the transparent substrate, thereby resulting in the lens cavity in the transparent substrate.

13. The method of claim 12, wherein forming the groove in the deposited photoresist is performed by exposure to light through a gray scale mask.

14. The method of claim 1, wherein, in step (a), the lens cavity is formed with an aspheric bottom surface.

15. The method of claim 5, wherein forming the groove in the deposited photoresist is performed by direct exposure to laser beams.

16. The method of claim 5, wherein forming the groove in the deposited photoresist is performed by electron beams.

17. The method of claim 7, wherein, in step (a), the lens cavity is formed with an aspheric bottom surface.

18. The method of claim 12, wherein forming the groove in the deposited photoresist is performed by direct exposure to laser beams.

19. The method of claim 12, wherein forming the groove in the deposited photoresist is performed by electron beams.

* * * * *